J. SRAKULA.
INTERCHANGEABLE WHEEL FOR VEHICLES.
APPLICATION FILED MAR. 23, 1918.
1,274,102.
Patented July 30, 1918.
2 SHEETS—SHEET 1.
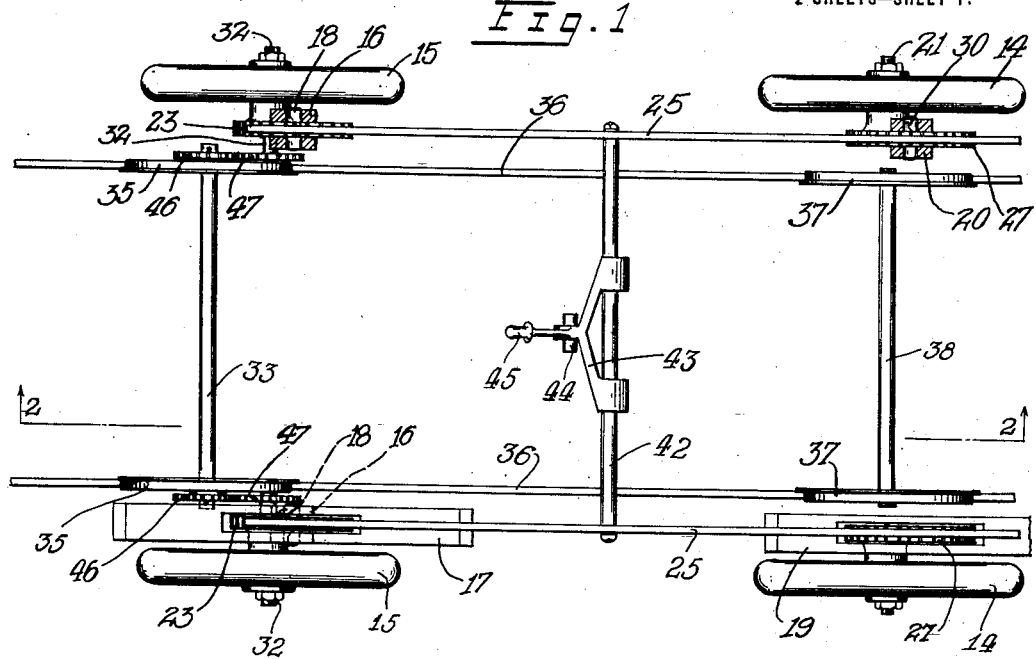
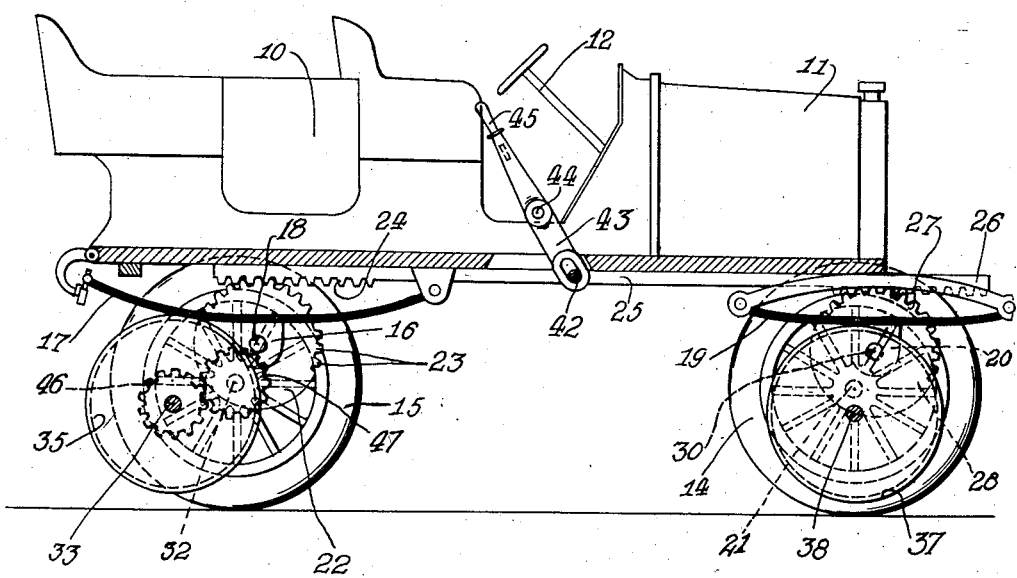
INVENTOR
JOSEPH SRAKULA
BY *Oscar Geier*
ATTORNEY

J. SRAKULA.
INTERCHANGEABLE WHEEL FOR VEHICLES.
APPLICATION FILED MAR. 23, 1918.

1,274,102.

Patented July 30, 1918.
2 SHEETS—SHEET 2.

INVENTOR
JOSEPH SRAKULA

BY *Onar Geier*

ATTORNEY

UNITED STATES PATENT OFFICE.

JOSEPH SRAKULA, OF LUGERVILLE, WISCONSIN.

INTERCHANGEABLE WHEEL FOR VEHICLES.

1,274,102.  Specification of Letters Patent.  Patented July 30, 1918.

Application filed March 23, 1918. Serial No. 224,273.

*To all whom it may concern:*

Be it known that I, JOSEPH SRAKULA, a subject of the Emperor of Austria, resident of Lugerville, county of Price, and State of Wisconsin, have invented certain new and useful Improvements in Interchangeable Wheels for Vehicles, of which the following is a specification.

This invention relates to improvements in vehicles and has as its special object the provision of means whereby the ordinary resilient wheels of the vehicle may be raised or lowered with respect to track wheels, mounted upon the vehicle in such manner as to be engaged upon ordinary railway tracks, such as the track of a street railway, the wheels being changed by the movement of a single lever controlled by the operator of the vehicle.

This and other like objects are attained by the novel construction and combination of parts hereinafter described and shown in the accompanying drawings, forming a material part of this disclosure and in which;

Figure 1 is a top plan view, of a vehicle frame to which the invention is applied.

Fig. 2 is a vertical sectional view, taken on line 2—2 of Fig. 1.

Figure 3:
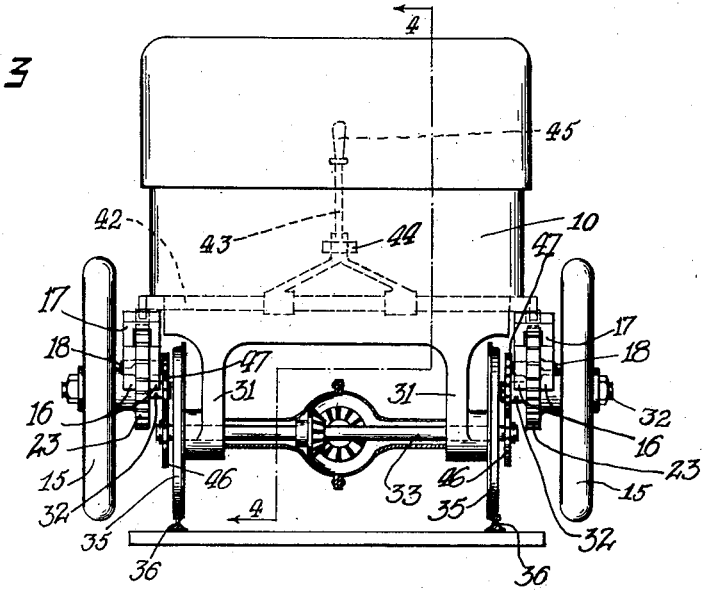
Fig. 3, is a rear view of the same.
Figure 4:
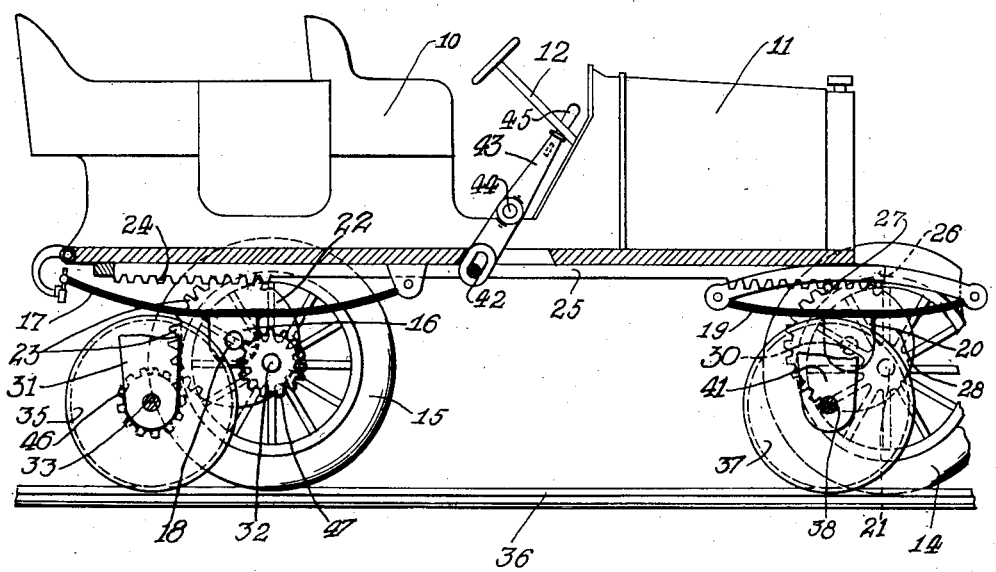
Fig. 4 is a vertical sectional view taken on line 4—4 of Fig. 3.

In the drawings the numeral 10, is applied to the super-structure or upper body of the vehicle, here shown to be of the automobile order, having means for self propulson contained in the casing 11, and provided with a steering means 12, through which the front wheels 14 are controlled. The rear driving wheels 15, of pneumatic type, are journaled upon spindles 32, rigidly fixed eccentrically in the outer side of disks 22, have teeth 23, formed upon a portion of their periphery.

These disks are rotatably mounted concentrically upon studs 18, engaged in brackets 16, secured to the lower side of semi-elliptic springs 17, connected with the rear portions of the vehicle frame.

Similarly the front wheels 14 are journaled upon spindles 21, fixed eccentrically in disks 28, having teeth 27 and concentrically mounted to rotate upon studs 30, engaged in brackets 20, secured to the lower side of the front leaf springs 19, in turn connected with the front part of the vehicle frame.

In order to raise or lower the wheels, relative to the body, there is engaged with the teeth 23 of the rear disks, racks 24, similar racks 26 engaging with the teeth 27 of the front disks, the racks being connected by bars 25.

Passing transversely through the bars 25, below the floor of the vehicle is a shaft 42, engaged in the center of which is the lever 43, pivoted on its hub 44, and having an extending operating handle 45, by means of which the racks may be moved either toward the front or rear of the vehicle, such movement obviously rotating the disks 22 and 28, thereby causing the wheels 14 and 15, by reason of their eccentric mountings, to assume different positions relative to the frame.

Engaged upon opposite sides of the frame, at the rear, are rigid, downwardly extending brackets, in which is journaled a shaft 33, having mounted upon each end wheels 35 having treads and flanges adapted to engage with track rails 36, similar wheels 37 at the front being mounted on a shaft 38, carried in brackets 41 attached to the front of the vehicle frame.

Power is transmitted to the shaft 33 in the usual manner and from it to the resilient rear wheels 15 by reason of spur pinions 44 secured adjacent to their hubs, the pinions being driven by meshing gears 46, secured to the shaft 33, the gears being only in mesh when the resilient wheels are used.

Thus by movement of the lever 45 it is easily possible to raise the vehicle, together with its load, so that the same rests upon the ordinary resilient wheels as shown in Fig. 2 or, by moving the lever toward the front, the ordinary driving wheels are raised, permitting the vehicle to rest upon the track wheels so that the vehicle may be moved along a railway.

Having thus described my invention what I claim as new and desire to secure by Letters Patent, is:—

1. In a vehicle, the combination with a front and rear pair of track wheels rigidly engaged with the frame of the vehicle, disks rotatably mounted at the sides of said frame, spindles extending outwardly from the sides of said disks, said spindles being eccentrically mounted therein, a plurality of teeth formed in the periphery of said disks, racks engaging with said teeth, means for moving said racks longitudinally whereby said disks are rotated, resilient wheels mounted upon said spindles, and means for driving said resilient wheels.

2. In a vehicle, the combination with a front and rear pair of flanged wheels adapted to make contact with the surface of a track rail, said wheels being rotatably mounted below the body of said vehicle, of opposed pairs of outwardly extending supports secured to the body of said vehicle, disks rotatably mounted in the said supports, said disks having teeth on a portion of the periphery thereof, eccentrically mounted studs in said disk extending outwardly, resilient wheels revolubly mounted upon said studs, a pair of racks engageable with the teeth of said disks, a lever for moving said racks rectilinearly of said vehicle whereby said resilient wheels are raised or lowered relatively to said track wheels, means for driving said track wheels, and means for transmitting power to said resilient wheels.

In testimony whereof I have affixed my signature.

JOSEPH SRAKULA.